United States Patent [19]

Landrevie

[11] Patent Number: 4,715,828
[45] Date of Patent: Dec. 29, 1987

[54] ELECTRICAL CONNECTION FOR ELECTRONIC CIRCUITS

[75] Inventor: Jacques Landrevie, La Chambre, France

[73] Assignee: Societe Nouvelle Rockall France S.A., Vitre, France

[21] Appl. No.: 802,774

[22] Filed: Nov. 27, 1985

[30] Foreign Application Priority Data

Dec. 4, 1984 [NZ] New Zealand ............ 210422

[51] Int. Cl.$^4$ .................................... H01R 13/04
[52] U.S. Cl. ........................................ 439/660
[58] Field of Search .................... 339/5, 6, 8, 176

[56] References Cited

U.S. PATENT DOCUMENTS

| | | | |
|---|---|---|---|
| 1,926,857 | 9/1933 | Moister | 339/6 R |
| 2,067,485 | 1/1937 | Gardner et al. | 339/6 R |
| 2,296,869 | 9/1942 | Peters et al. | 339/6 R |
| 3,181,715 | 5/1965 | Olson | 339/5 P |
| 3,439,307 | 4/1969 | Ruscher | 339/8 R |

Primary Examiner—Joseph H. McGlynn
Attorney, Agent, or Firm—Blakely, Sokoloff, Taylor & Zafman

[57] ABSTRACT

An electrical connecting device for the temporary connection of electrical or electronic circuits comprising a contact area and a contactor device. The contact area has a plurality of concentric zones of conductive material. Each zone is isolated from the other and a first electrical or electronic circuit is coupled to the conductive zones. The contactor device has a plurality of contacts so disposed that one or more contacts can be bought into engagement with the conductive zones of the contact area. A second electrical or electronic circuit is coupled to the contacts of the contactor device. The contact area can be mounted within a suitable carrier for attachment to an object to be identified. By placing the contactor device in engagement with the contact area, information can be read from or programmed into the first circuit by the second circuit which may comprise a data processing device.

7 Claims, 4 Drawing Figures

4,715,828

ELECTRICAL CONNECTION FOR ELECTRONIC CIRCUITS

FIELD OF THE INVENTION

This invention relates to a connecting device for the temporary connection of electrical or electronic circuits.

BACKGROUND ART

In our French Patent Specification No. 2514179 there is described a label which can be attached to an object to be identified. This label incorporates a zone in which a semi-conductor circuit is located, the semi-conductor circuit being programmed with data relative to the object to be identified. A device is provided for interrogation and/or programming of the semi-conductor circuit, this device having a plurality of contacts which can be brought into temporary contact with a plurality of contacts of the semi-conductor circuit. To ensure that the contacts of the device and semi-conductor circuit make correct contact it is disclosed that the semi-conductor circuit be located within a shaped recess into which the correspondingly shaped housing of the device can be inserted. The interrogating/programming device is coupled via a cable to a data processing device.

The label according to the aforesaid patent specification can be attached to an object to be identified by any suitable means. For example, it can be formed as, or part of, a tag for attachment to an animal, e.g. the animal's ear, and the semi-conductor circuit can be programmed with suitable information about the animal such as, for example, its age, origin, breed, veterinary history, medicines administered prescribed diet, etc. The farmer is thus able, by bringing the interrogating/programming device into contact with the semi-conductor circuit of the tag, to either identify the animal and obtain information stored in the tag, or modify the contents of the tag. This data transfer can be carried out extremely quickly once the interrogation/programming device is brought into contact with the semi-conductor circuit.

It is evident, however, that such data transfer relies on a temporary but effective connection between the interrogating/programming device and the semi-conductor circuit.

Whilst the arrangement disclosed in the aforesaid patent specification works effectively in permitting the interrogation and/or programming of the semi-conductor circuit, the connection between the device and the circuit is not always sufficiently positive to ensure that there is correct contact between the device and the circuit. This lack of correct contact is accentuated by movement of the label, especially when it is a tag attached to an animal.

In French Patent Specification No. 8315466 there is described and claimed an automatic electrical connection for the rapid temporary connection of electronic circuits, this connection being intended for use in the arrangement disclosed in our French Patent Specification No. 2514179. The arrangement disclosed in Specification No. 8315466 relies on positive angular location of the device by mechanical means and then electronically determining which contacts of the device are in engagement with the contacts of the semi-conductor circuit. The mechanical means, however, can result (in certain dispositions) in the device not making correct contact with the contacts of the semi-conductor circuit whilst the electronic means provided for sensing which contacts of the device have engaged with which contacts of the semi-conductor circuit lead to complexities in the electronic circuitry.

The present invention aims to provide a connecting device for the temporary connection of electric or electronic circuits without a requirement for angular positioning and automatic determination of orientation of contacts.

BRIEF SUMMARY OF THE INVENTION

Broadly in one aspect the present invention provides a connecting device for the temporary connection of electrical or electronic circuits comprising a contact area having a plurality of concentric zones of conductive material, each zone being isolated from the other and coupled to a first electrical or electronic circuit, and a contactor device having a plurality of contacts so disposed that when the contactor device is located with the contact area, one or more contacts are brought into engagement with said conductive zones, said one or more contacts being coupled to a second electrical or electronic circuit.

Preferably the conductive zones are of concentrically disposed annular shapes with a central conductive zone of disc shape being located within the confines of the innermost annular shape. The contact area can be disposed within a shaped recess and the contactor device can have a similarly shaped portion which is engagable in the recess to provide said location of the contactor device with the contact area.

In a preferred form of the invention the contacts are in the form of a plurality of probes which are adapted to be movable so as to project from the contactor device when it is located with the contact area and thereby come into engagement with the conductive zones.

The invention also provides an electronic identification device comprising a carrier having mounting means adapted to permit the carrier to be mounted with an object to be identified, a contact area having a plurality of concentric zones of conductive material, each zone being isolated from the other, a shaped recess in said carrier, said contact area being located within said recess and positioned such that the conductive zones are accessible to temporary connection with contacts carried by a contactor device having a shaped portion engagable in said recess, said conductive zones being coupled to a programmable electronic integrated circuit.

DESCRIPTION OF THE DRAWINGS

In the following more detailed description of the invention according to its preferred embodiment reference will be made to the accompanying drawings in which.

DETAILED DESCRIPTION OF PREFERRED EMBODIMENT

Figure 1:
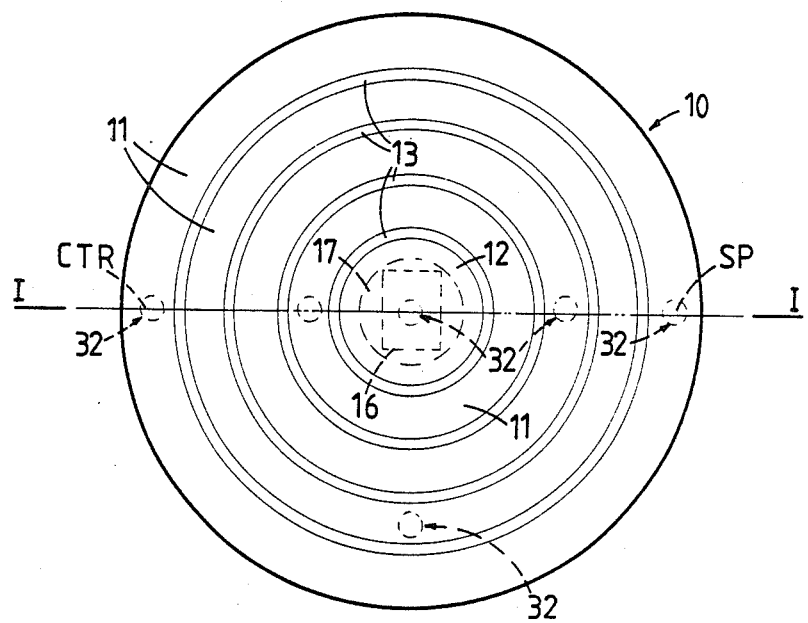
FIG. 1 is a plan view of the contact area.
Figure 2:
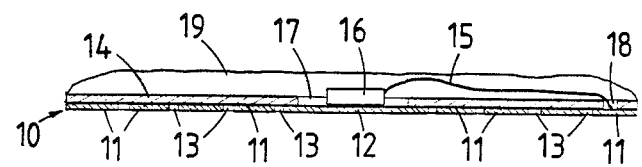
FIG. 2 is a sectioned elevational view on line I—I of FIG. 1.

In the preferred form of the invention as illustrated, the contact area 10 comprises a plurality of concentric annular rings 11 preferably disposed about a central disc shaped conductive zone 12. These conductive zones 11 and 12 are located on a support 14 formed of an insulative material. Due to the conductive zones 11 and 12 being spaced apart thin ring-like spaces 13 are formed between the conductive zones 11 and 12 thereby resulting in zones 11 and 12 being isolated from each other. Each conductive zone 11 and 12 is coupled via a connecting bond wire or the like 15 to a circuit which in the illustrated form of the device is an integrated electronic circuit 16. Circuit 16 is located within a recess 17 in planar support element 14 and is thus conveniently bonded to the surface of central disc 12. The bond wires 15 extend from circuit 16 and through apertures 18 in support 14 so as to connect to the surface of the conductive zones 11 which are bonded to support 14. A suitable covering 19 of a settable material such as expoxy is applied over the surface of support 14 with the result that the circuit 16 and bond wires 15 are encased. It will also be appreciated that the apertures 18 do not open externally of the encasement 19 and that the connections of bond wires 15 to the conductive zones 11 are fully encased and therefore not open to damage, disconnection or moisture.

In an alternative arrangement a printed circuit is provided on the surface of support 14 and short bond wires extend between circuit 16 and the printed circuit. This printed circuit thus provides conductive tracks between circuit 16 and each of the conductive zones 11. According to a still further arrangement the body wires 15 or printed circuit can be sandwiched between the support 14 and an additional support member.

The contact area 10 with its circuit 16 can be mounted within a suitable carrier C (see FIG. 4) such as a label of plastics material. The label can be in the form of an animal ear tag or part of an animal ear tag. The so mounted contact area has its conductive zones 11 and 12 exposed though, in an alternative form of the invention, the conductive zones can be covered by a thin film of a soft elastomeric material which is both insulating and self-repairing.

Figure 3:
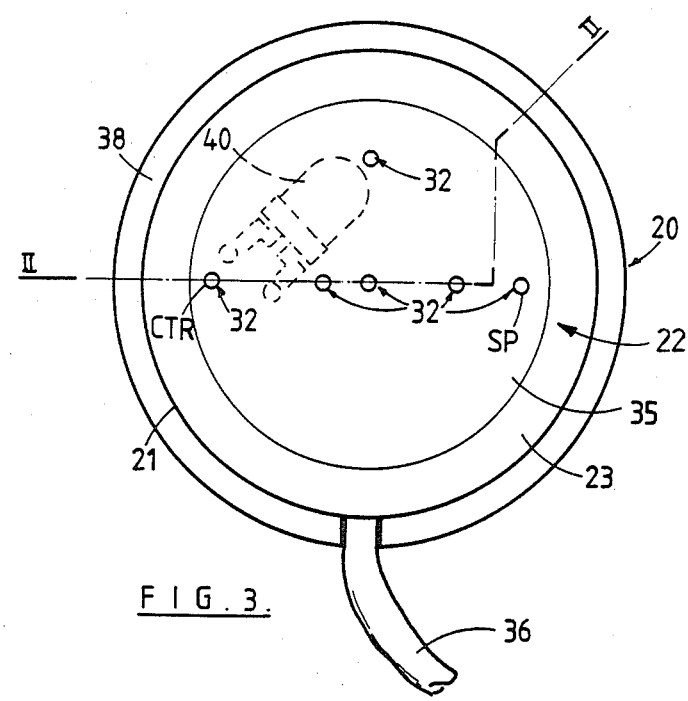
FIG. 3 is a plan view of a contactor device.
Figure 4:
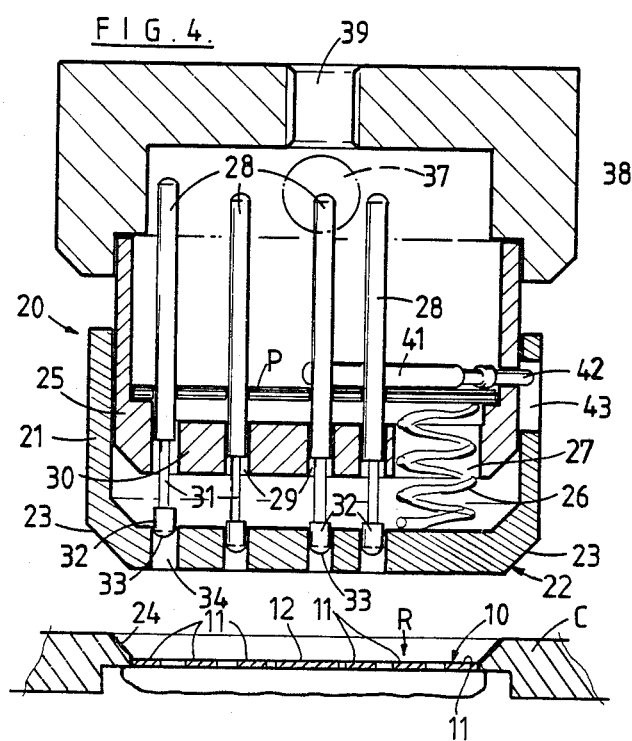
FIG. 4 is a sectioned elevational view on line II—II of FIG. 3.

Referring to FIGS. 3 and 4 of the drawings, there is shown a form of contact device 20. The device comprises a housing 21 which has a lower shaped end portion 22 which is engagable within a recess R of the label C. The contact area 10 is located in the label C so that the conductive zones 11 and 12 are located in the bottom of the recess R.

The shaped end portion 22 preferably is circular when viewed in plan (see FIG. 3) and has sloping side walls 23 which mate with the sloping side walls 24 of recess R. The shaped end partition 22 and sloping walls 24 thus provide location means whereby the housing 21 can be positively located within the recess R.

A plunger 25 is slidingly located within housing 21. A spring 26 is accommodated within the housing 21 and extends through an opening 27 in the bottom floor 30 of plunger 25 to engage with a portion P carried in the plunger. The spring 26 thereby biases the plunger 25 to the position shown in FIG. 4.

The probes of the contactor device 20 preferably comprise an elongate housing 28 located within the plunger 25 and mounted by one end in an aperture 29 in floor 30. A rod 31 is slidingly mounted within said housing 28 and is biased by a spring (not shown) located within the housing. The rod 31 can thus telescope with housing 28. The free end of the rod 31 can form the probe end but in the preferred form the probe end is a head portion 32 with a curved contact surface 33. In the non-use configuration of the device as shown in FIG. 4 the probe heads 32 are confined within apertures 34 in the floor 35 of housing 21.

A conductive element (not shown) is attached to each pin housing and extends as part of a flexible cable 36 to a data processing device or terminal. This data processing terminal is of conventional construction and operation and thus a description thereof is not required for the purposes of this specification.

Cable 36 extends through an opening 37 in an end cap 38 on the upper end of plunger 25. This end cap 38 provides a surface which can be gripped in the hand of a user. Alternatively, end cap 38 can be mounted with a support suitable configured and constructed according to the manner in which the connector device is to be used. For example, the end cap support can be part of automatic mechanical means which moves the contactor into engagement with a contact area when the contact area has been suitable located. An opening 39 can be formed in end cap 38 to permit mounting thereof.

In use the contact area is, as previously described, supported by a carrier C which can, for example, be an animal ear tag. A person wishing to interrogate the tag or modify the information contained therein places the contactor device 20 against the tag so that the shaped end portion 22 fits within recess R. By pushing end cap 38 plunger 25 moves against the pressure of spring 26 with the result that probes 32 are caused to project from apertures 34 in the lower end 35 of the housing 21 and thereby come in contact with conductive zones 11 and 12. The mounting of probes 32 is, as previously described, such that continued movement of plunger 25 once probes 32 come in contact with the conductive zones 11 and 12 results in the rods 31 sliding in housing 28 against the pressure of the springs therein. This thereby ensures that a good contact is made between each probe 32 and the respective conductive zone. Once contact between the contact area 10 and the contactor device 20 is established, interrogation and/or programming of circuit 16 can take place. When the contactor device 20 is removed plunger 25 moves under the pressure of spring 26 to retract probes 32 into the confines of apertures 34 so that they are not likely to be damaged.

The connector device 20 has at least one probe 32 for each conductive zones 11 and 12. In the preferred form of the invention there are two probes for one conductive zone 11, preferably the outermost zone. The housings 28 of these two probes are so positioned that the probes are located further back in the connector device (see for example the left hand housing 28 in FIG. 4). As a result these two probes come into contact with the respective conductive zone 11 after the other probes have made contact. It is preferred that the housings of these two probes are also slightly out of alignment with one another so that one probe makes contact with the outermost conductive zone 11 before the other.

Probes 32 form data transfer pins to enable transfer of data to and from the integrated circuit 16. One of the aforementioned outermost probes 32 forms a supply pin (SP) whilst the other outermost probe forms a "clear to receive" pin (CTR). Accordingly, when the SP probe contacts the conductive zone 11 (it being the first to contact the zone) a current limited voltage is applied and via the CTR probe (which contacts slightly after the SP probe) this voltage is sensed by the data processing terminal to indicate correct contact of the contacting device 20 with contact area 10. As the SP and CTR probes must contact with the contact area 10 last, this sensing of the current limited voltage indicates that all probes must be in contact with the contact area 10. The terminal then removes the current limit to achieve operating requirements and interrogation or programming of circuit 16 to take place.

The contact of CTR probe with conductive zone 11 is continuously monitored by the terminal during interrogation/ programming. If it becomes disconnected from zone 11 then immediately all voltage to the contact area 10 is removed or dropped to a level where damage to circuit 16 is avoided.

As a visual verification an LED 40 is mounted within plunger 25, preferably on partition P. This LED glows to verify correct interrogation/programming and is visible through the end cap 38 and/or plunger being of a translucent material.

Partition P is preferably in the form of, or part of, a printed circuit which is connected to cable 36 and to the probes 32.

To retain plunger 25 and housing 21 together a locking pin 41 is provided. This pin has a waisted end portion 42 which engages in an elongate slot 43 in the side wall of plunger 25. The locking pin 41 thus not only locks the components together but also provides a limiting means to control the stroke of plunger 25 in housing 21.

The inventive arrangement thus provides a contact area 10 provided with several conductive zones of concentric and circular shape with each zone being connected with different contacts of a circuit which is to be operated, e.g. an integrated electronic circuit, and a connector device 20 with telescopic probes mounted in alignment with the conductive zones of the contact area 10 thereby enabling the circuit of the contact area to be joined with a circuit coupled to the contactor device. The shaping of the end portion 22 of the housing 21 which fits within the recess R allows for natural alignment of the conductive zones with the probes. There is thus no need for precise angular positioning of the contact device 20 and, in fact, a certain lateral displacement at least equal to the width of the conductive zones is permissible.

The arrangement also permits the presence of a plurality of probes for each conductive zone without the risk of short circuits between the zones caused by misalignment of the contactor device 20 with the contact area 10 resulting in probes coming in contact with incorrect conductive zones. In addition this leads to better reliability and only slight contact resistance (inversely proportional to the number of probes per conductive zone).

According to the invention, there is provided a reliable and effective means of providing connection between two electric or electronic circuits even when one circuit is attached to a mobile object such as an animal.

I claim:

1. A connecting device for the connection of first and second electrical of electronic circuits, said device comprising
   a planar contact surface formed by a plurality of annular conductive zones disposed concentrically about an axis vertical to said planar surface, each conductive zone being isolated from the others and connected to said first circuit;
   a contactor device having a plurality of separate spaced apart contacts each connected to said second circuit and each being for conductive engagement with a particular annular conductive zone said contactor device having a housing and a plunger slidingly located therein, said contacts being carried by said plunger and being projectable from said housing responsive to sliding movement of said plunger; and
   locating means for automatically positioning, when a leading portion of said contactor device is positioned over said planar contact surface, each contact for engagement with its said particular annular conductive zone irrespective of the angular positioning of the leading portion of the contactor device relative to the contact surface such that with all contacts engaged with the contact surface said first and second circuits are electrically coupled.

2. The device as claimed in claim 1 wherein the conductive zones are mounted on a planar support element, said support element having a plurality of openings therein which extend through to said conductive zones, there being connection means from said first circuit which connect said first circuit to said conductive zones via said openings, said connection means and said first circuit being encased within a settable material applied to said support element.

3. The device as claimed in claim 2 wherein the first circuit is an integrated electronic circuit which is located within a recess in the support element.

4. A connecting device for the connection of first and second electrical or electronic circuits, said device comprising:
   a planar contact surface formed by a plurality of annular conductive zones disposed concentrically about an axis vertical to said planar surface, each conductive zone being isolated from the others and connected to said first circuit;
   a contactor device having a plurality of separate spaced apart contacts each connected to said second circuit and each being for conductive engagement with a particular annular conductive zone, said contactor device having a housing and a plunger slidingly located therein, said contacts being carried by said plunger and being projectable from said housing responsive to sliding movement of said plunger, wherein said contacts are probes which are located by probe carriers mounted by said plunger, the probes being movably mounted by said probe carriers such as to be movable relative to both said housing and plunger; and
   locating means for automatically positioning, when a leading portion of said contactor device is positioned over said planar contact surface, each contact for engagement with its said particular annular conductive zone irrespective of the angular positioning of the leading portion of the contactor device relative to the contact surface such that with all contacts engaged with the contact surface said first and second circuits are electrically coupled.

5. The device as claimed in claim 4 wherein the probes are so mounted that movement of the plunger in the housing causes a number of said probes to project from the housing in advance of other probes.

6. The device as claimed in claim 4 wherein the conductive zones are mounted on a planer support element, said support element having a plurality of openings therein which extend through to said conductive zones, there being connection means from said first circuit which connect said first circuit to said conductive zones via said openings, said connection means and said first circuit being encased within a settable material applied to said support element.

7. The device as claimed in claim 6 wherein the first circuit is an integrated electronic circuit which is located within a recess in the support element.

* * * * *